(12) United States Patent
Leguin et al.

(10) Patent No.: US 8,910,039 B2
(45) Date of Patent: Dec. 9, 2014

(54) FILE FORMAT CONVERSION BY AUTOMATICALLY CONVERTING TO AN INTERMEDIATE FORM FOR MANUAL EDITING IN A MULTI-COLUMN GRAPHICAL USER INTERFACE

(75) Inventors: Damien Leguin, Paris (FR); Adriana Vizinho, Saint-Michel-sur-Orge (FR)

(73) Assignee: Accenture Global Services Limited, Dublin (IE)

( * ) Notice: Subject to any disclaimer, the term of this patent is extended or adjusted under 35 U.S.C. 154(b) by 333 days.

(21) Appl. No.: 13/228,837

(22) Filed: Sep. 9, 2011

(65) Prior Publication Data
US 2013/0067313 A1    Mar. 14, 2013

(51) Int. Cl.
G06F 17/22    (2006.01)
G06F 17/24    (2006.01)
G06F 17/21    (2006.01)

(52) U.S. Cl.
CPC .............. *G06F 17/21* (2013.01); *G06F 17/24* (2013.01); *G06F 17/211* (2013.01); *G06F 17/2247* (2013.01); *G06F 17/2264* (2013.01)
USPC ............................. 715/249; 715/234; 715/243

(58) Field of Classification Search
CPC ... G06F 17/21; G06F 17/211; G06F 17/2247; G06F 17/2264; G06F 17/24
USPC .......................................... 715/234, 249, 243
See application file for complete search history.

(56) References Cited

U.S. PATENT DOCUMENTS

| | | | | |
|---|---|---|---|---|
| 6,336,124 B1* | 1/2002 | Alam et al. | ................... | 715/205 |
| 6,466,240 B1* | 10/2002 | Maslov | ......................... | 715/234 |
| 6,732,102 B1* | 5/2004 | Khandekar | .......................... | 1/1 |
| 6,915,484 B1* | 7/2005 | Ayers et al. | ................... | 715/234 |
| 7,698,659 B1* | 4/2010 | Rainwater et al. | ............ | 715/854 |
| 2001/0032218 A1* | 10/2001 | Huang | ......................... | 707/513 |
| 2002/0118379 A1* | 8/2002 | Chakraborty et al. | ......... | 358/1.9 |
| 2004/0139400 A1* | 7/2004 | Allam et al. | .................. | 715/526 |
| 2004/0181746 A1* | 9/2004 | McLure et al. | ............... | 715/500 |
| 2006/0101058 A1* | 5/2006 | Chidlovskii | .................. | 707/102 |
| 2006/0136353 A1* | 6/2006 | Crockett et al. | .................. | 707/1 |
| 2006/0271843 A1* | 11/2006 | Yarde et al. | .................... | 715/513 |
| 2008/0263032 A1* | 10/2008 | Vailaya et al. | .................... | 707/6 |
| 2010/0199197 A1* | 8/2010 | Faletski et al. | ................ | 715/760 |
| 2012/0185511 A1* | 7/2012 | Mansfield et al. | ............ | 707/792 |

OTHER PUBLICATIONS

Adobe, Adobe Acrobat 8 Professional User Guide, 2007, http://help.adobe.com/archive/en_US/acrobat/8/professional/acrobat_8_help.pdf.*

Adobe, Acrobat and Adobe Reader System Requirements, Jun. 15, 2010, http://kb2.adobe.com/cps/837/cpsid_83708/attachments/Acrobat_Reader_SystemRequirements.pdf.*

(Continued)

*Primary Examiner* — Cesar Paula
*Assistant Examiner* — Yahao Chen
(74) *Attorney, Agent, or Firm* — Brinks Gilson & Lione (57) ABSTRACT

Data in a first file is accessed. The data is in a first format, and can include text elements and image elements. The elements are displayed in a first window that allows the elements to be manually edited. A user input that causes a change to an element in the first window may be received. The elements, including any changes, are stored in a second file that is in a second (different) format. A second window is used to display the contents of the second file including any changes.

20 Claims, 4 Drawing Sheets

| CONTENT WINDOW 520 | | | |
|---|---|---|---|
| PAGE | SECTION | ELEMENT | CONTENT |
| 1 | H1 | Page Break* | CHAPTER ONE |
| | | br - C | |
| | P* | Section | HUCKLEBERRY FINN |
| | | Section* | Scene |
| | P* | c | : The Mississippi Valley |
| | | br* | Time |
| | | c | : Forty to fifty years ago |
| | | Section* | Y |
| | | c | ou don't know me, without you have read a book by the |
| | P* | - | Name of |
| | | -* | The Adventures of Tom Sawyer |
| | | - | ; but that ain't no matter. That |

(56) References Cited

OTHER PUBLICATIONS

Hervé Déjean and Jean-Luc Meunier, A system for converting PDF documents into structured XML format, 2006, Springer-Verlag, In Proceedings of the 7th international conference on Document Analysis Systems (DAS'06), 129-140.*

Deliang Jiang and Xiaohu Yang, Converting PDF to HTML approach based on text detection, 2009, ACM, In Proceedings of the 2nd International Conference on Interaction Sciences: Information Technology, Culture and Human (ICIS '09), 982-985.*

Tamir Hassan, PDF to HTML Conversion, 2002, University of Warwick.*

Adobe, Using Adobe Dreamweaver CS4, Sep. 24, 2009, http://help.adobe.com/archive/en_US/dreamweaver/cs4/dreamweaver_cs4_help.pdf.*

"ABC Amber PDF Converter" http://abc-amber-pdf-converter.en.softonic.com/, softonic, version 3.12, created 2006, last visited Jul. 31, 2014, 11 pages.

"Gemini" http://www.iceni.com/gemini-features.htm, iceni Technology, Feb. 18, 2007, last visited Jul. 31, 2014 1 page.

"PDF-to-HTML" http://pdf-to-epub.xstudio.biz/pdf-to-html-converter.html, Aug. 23, 2010, last visited Jul. 31, 2014, 2 pages.

"PDF-to-ePub" http://pdf-to-epub.xstudio.biz/pdf-to-epub-converter.html, Aug. 23, 2010, last visited Jul. 31, 2014, 2 pages.

* cited by examiner

| CONTENT WINDOW 520 | | | |
|---|---|---|---|
| PAGE | SECTION | ELEMENT | CONTENT |
| 1 | H1 | Page Break* | CHAPTER ONE |
| | | br - C | |
| | P* | Section | HUCKLEBERRY FINN |
| | | Section* | Scene |
| | P* | c | : The Mississippi Valley |
| | | br* | Time |
| | | c | : Forty to fifty years ago |
| | P* | Section* | Y |
| | | c | ou don't know me, without you have read a book by the |
| | | - | Name of |
| | | -* | The Adventures of Tom Sawyer |
| | | - | ; but that ain't no matter. That |

FILE FORMAT CONVERSION BY AUTOMATICALLY CONVERTING TO AN INTERMEDIATE FORM FOR MANUAL EDITING IN A MULTI-COLUMN GRAPHICAL USER INTERFACE

BACKGROUND

Electronic books (e-books) are increasing in popularity, and many different e-book formats exist: EPUB, Mobipocket, PDF, HTML, and .azw, for example. In order to address a wide range of distributors in different countries, a publisher should have e-book versions for each format. Generally speaking, the electronic version of a book should be true to the non-electronic version in content and layout. For example, page settings and text structure elements such as paragraphs, headers, image layouts, and chapter breaks in the electronic version should be the same as they are in the non-electronic version.

Most of the time, the electronic version that publishers have has a fixed layout (e.g., Portable Document Format (PDF) files). However, most of the e-book formats are Extensible Markup Language (XML)-based and are meant to stream a text in an adaptative layout.

Conventional solutions for converting from a fixed layout are burdensome and not entirely user-friendly. For example, a book may be converted from a PDF file into a draft HyperText Markup Language (HTML) file, which is then edited manually to correct aspects of the HTML draft such as pagination and formatting. This type of editing can be difficult, and also requires the editor to be trained to work with such a file.

As a consequence, converting an e-book from a fixed layout (e.g., PDF) file to an adaptive layout is problematic. No tool able to professionally convert a fixed layout file to other e-book formats is currently available; the appearance of the book can be preserved only at the cost of the loss of e-book functionalities (e.g., the capability to change the text size while keeping the same page size, the capability to change the text font, etc.).

Therefore, a tool that facilitates the proper conversion of books to electronic books would be valuable.

SUMMARY

Embodiments according to the present invention pertain to user-friendly methods and systems for converting a fixed layout file (e.g., a PDF file) into an adaptive file (e.g., an XML-like file such as an HTML file), which can be edited using the user-friendly tool disclosed herein and is formatted for automatic conversion into other electronic book (e-book) formats. The resultant XML-like file is true to the input file in content and appearance and preserves e-book functionalities and capabilities for the formats into which the file will subsequently be converted (e.g., the capability to change text size without changing page size).

In one embodiment, a first file is accessed. The first file includes data in a fixed layout format (e.g., PDF). The data represents elements such as text elements and image elements. The elements are displayed in a first window (e.g., a content window). By interacting with the contents of the first window, a user (editor) can make a change to the elements in the first window. The elements, including the change, are stored in a second file that is in an adaptive layout format (e.g., HTML).

A second window (e.g., a preview window) can be displayed along with the first window. The second window presents a display that is based on contents of the second file. A third window (e.g., a reference window), which presents a display based on the contents of the first (e.g., PDF) file, can also be displayed, so that the editor can conveniently compare the preview version against the "original" version.

The elements in the first (e.g., PDF) file are automatically extracted and ordered. The elements can be given a status that identifies how an element is related to another (e.g., the preceding) element in the ordered listing. The statuses allow the elements to be separated into sections (e.g., paragraphs, headings). A style (e.g., type of font, font size, etc.) is associated with the text elements in each kind of section. A style for a section can be overridden by a style for a class.

In one embodiment, the first file and the second file can be automatically linked. In other words, both the first (e.g., PDF) file and the second (e.g., HTML) file can be linked as a project. The project may be identified by a name, and both the first and second files can be accessed using the project name.

In summary, embodiments according to the present invention provide a semiautomatic conversion tool (e.g., for PDF-to-HTML conversion) that improves upon current e-book conversion techniques. The automatic portion of the tool initializes the conversion, doing most of the work quickly to create a draft version. The manual portion of the tool permits an editor, using a user-friendly interface, to readily make any changes to the draft version that might be needed. The resulting file is fully ready for conversion to other e-book formats in a manner that is true to the original in content and appearance/layout.

These and other objects and advantages of the present invention will be recognized by one skilled in the art after having read the following detailed description, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention. Like numbers denote like elements throughout the drawings and specification.

DETAILED DESCRIPTION

In the following detailed description of embodiments according to the present invention, numerous specific details are set forth in order to provide a thorough understanding of those embodiments. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system such as computer system 100 of FIG. 1.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "displaying," "rendering," "editing," "receiving," "storing," "providing," "generating," "extracting," "associating," "grouping," "encoding," "saving," "linking," or the like, may refer to the actions and processes of a computer system (e.g., flowchart 700 of FIG. 7), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Figure 1:
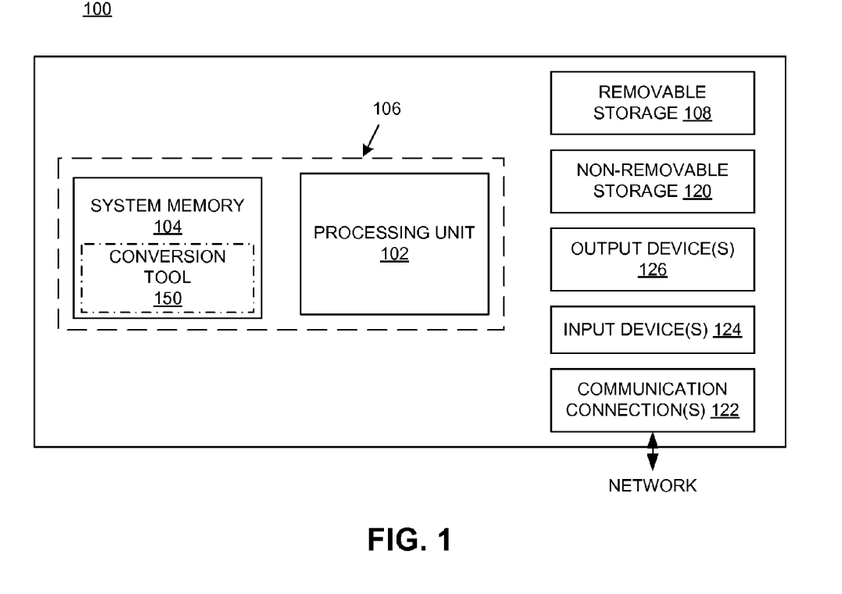
FIG. 1 is a block diagram of an example of a computer system upon which embodiments of the present invention can be implemented.

FIG. 1 shows a block diagram of an example of a computer system 100 upon which the embodiments described herein may be implemented. In its most basic configuration, the system 100 includes at least one processing unit 102 and memory 104. This most basic configuration is illustrated in FIG. 1 by dashed line 106. The system 100 may also have additional features/functionality. For example, the system 100 may also include additional storage (removable and/or non-removable) including, but not limited to, magnetic or optical disks or tape. Such additional storage is illustrated in FIG. 1 by removable storage 108 and non-removable storage 120. The system 100 may also contain communications connection(s) 122 that allow the device to communicate with other devices.

Generally speaking, the system 100 includes at least some form of computer-usable media. Computer-usable media can be any available media that can be accessed by the system 100. By way of example, and not limitation, computer-usable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed by the system 100. Any such computer storage media may be part of the system 100. The memory 104, removable storage 108 and non-removable storage 120 are all examples of computer storage media.

Communication media can embody computer-readable instructions, data structures, program modules or other data and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media. The communications connection(s) 122 is/are an example of communication media.

The system 100 may also have input device(s) 124 such as keyboard, mouse, pen, voice input device, touch input device, etc. Output device(s) 126 such as a display, speakers, printer, etc., may also be included.

The system 100 may operate in a networked environment using logical connections to one or more remote computers. When used in a networking environment, the system 100 can be connected to the network through the communication connection(s) 122.

In the example of FIG. 1, the memory 104 includes computer-readable instructions, data structures, program modules, and the like associated with conversion tool 150. However, the conversion tool 150 may instead reside in any one of the computer storage media used by the system 100, or may be distributed over some combination of the computer storage media, or may be distributed over some combination of networked computers. Elements and functionalities associated with the conversion tool 150 are described further in conjunction with FIGS. 2 through 7.

Figure 2:
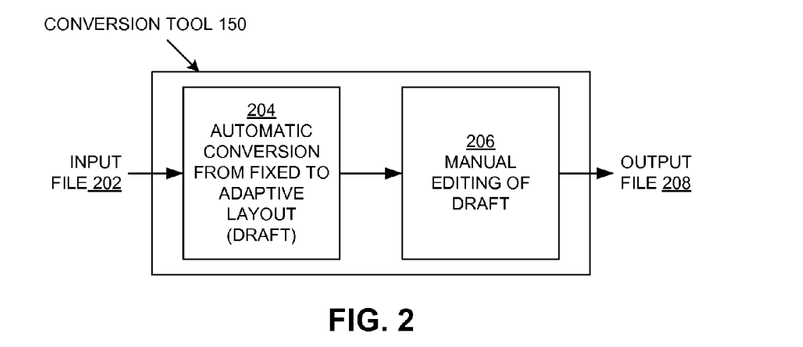
FIG. 2 illustrates a conversion process according to embodiments of the present invention.

FIG. 2 is a block diagram that illustrates the conversion process performed by embodiments of the conversion tool 150 according to the present invention. In the example of FIG. 2, a fixed layout (e.g., PDF) input file 202 is accessed and converted into an adaptive layout output file 208 (e.g., an XML-like file such as HTML file). The resultant output file 208 is true to the fixed layout file in content and appearance and preserves e-book functionalities and capabilities for the formats into which the files may subsequently be converted. The input file 202 can contain data (text elements and image elements) for a document such as a book. The output file 208 is formatted for automatic conversion into an electronic document such as an electronic book (e-book). More specifically, the output of the conversion tool 150 is one or more exports that, in one embodiment, are compressed files (e.g., plain zip files) that contain an XML-like file in XHTML (eXtensible HyperText Markup Language) format, formatted for automatic e-book conversion, and associated files (e.g., images, fonts, style sheets).

The conversion tool 150 includes an "automatic" stage 204 and a "manual" stage 206. In the automatic stage, the input file 202 is automatically converted to a draft of the output file 208. The format of the draft is that of the output file 208. Information can be taken from the file 202 so that the style and format of the draft are representative of the original document captured by the file 202. In the manual stage, the draft output can be edited.

Figure 3:
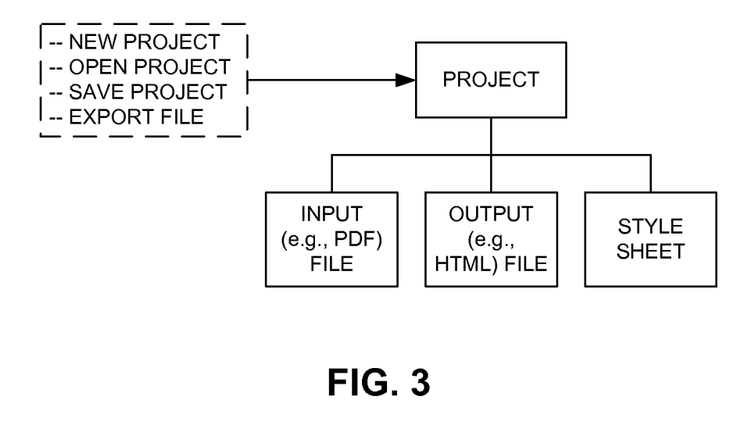
FIG. 3 illustrates associations between files in a conversion process according to embodiments of the present invention.

In one embodiment, the conversion tool 150 is project-based. As used herein, a project is a file that contains a path to an input (e.g., PDF) file and a path to an export (e.g., XML-like/HTML) file, as represented in FIG. 3. When defining a project, it is possible to link an input file, an export (output) file, and a predefined style sheet. A style sheet defines a style for each kind of section (e.g., a paragraph) and class (which are defined below). For example, a style sheet for a section can define font size and type, text alignment, and other characteristics (such as bold text, italics, and underlining) that are to be applied across the section. Similarly, a style sheet can define a style for a class. If a style is defined for a class, then the style for the class overrides the style defined for the section for the elements in the class. In other words, a section stylesheet can be defined for one or more sections and can be applied to all elements in the section(s); a class stylesheet can also be defined and applied to selected elements in the section(s), overriding any section stylesheet previously applied to those selected elements.

In one embodiment, the input file 202, the output file 208, and the predefined style sheet are linked using a drop-down menu and a sequence of pop-up windows. For example, the drop-down menu might include the following items: "New Project," "Open Project," and "Save Project." When "New Project" is selected, a window is opened that allows a user to enter (type in or browse for) an input (e.g., PDF) file, an output (e.g., HTML) file, and/or a style sheet. Once that information is entered, the project can be saved by name, which can be used to subsequently open the project. The drop-down menu can also include a selection that allows the output file to be exported.

Figure 4:
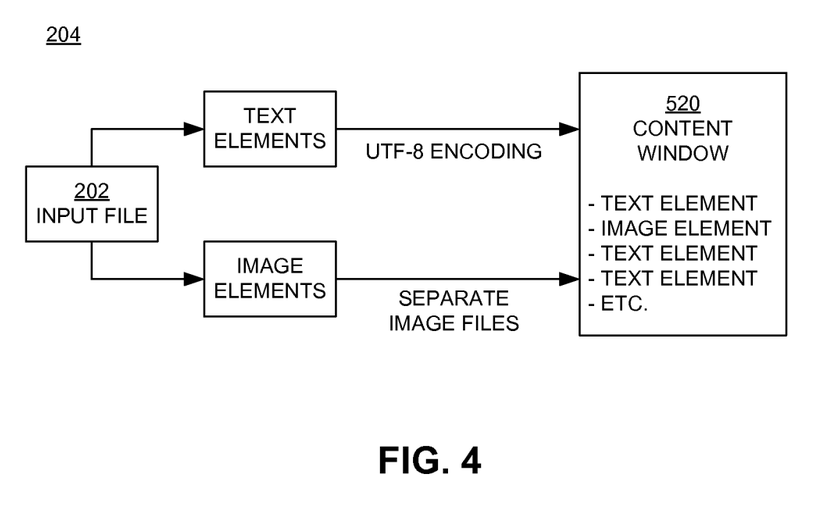
FIG. 4 illustrates the automatic stage of a conversion tool according to embodiments of the present invention.

FIG. 4 provides additional information with regard to the automatic stage 204 of the conversion tool 150 (FIG. 2). In the automatic stage, the text and image elements in the input file 202 are extracted and placed in order (based on the order in which they appear in the original document). For example, a text element may be a single letter, a line, or a paragraph, and the text elements are extracted and properly ordered (e.g., the first line follows the second line, and so on).

Various properties associated with each text element can also be extracted from the input file 202. Those properties can include, for example, font type, font size, position and alignment (e.g., centered, right-justified), and color. An image element includes an image of any type along with associated properties, such as the position of the image in the page.

The text and image elements in the input file 202 are extracted and then transformed so that they can be utilized by the conversion tool 150. In one embodiment, the text elements are encoded in UTF-8 (Universal Character Set Transformation Format—8-Bit), and image elements are saved as separate image files. Each text and image element can be listed in a content window 520 (see FIGS. 5 and 6), where they can be individually edited.

Figure 5:
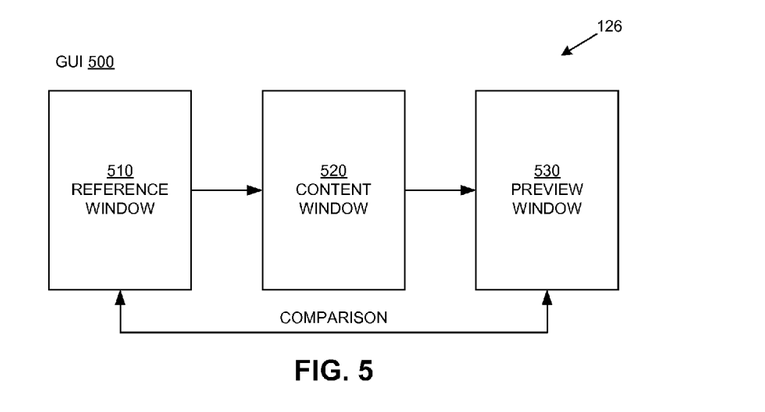
FIG. 5 illustrates a graphical user interface generated by a conversion tool according to embodiments of the present invention.

FIG. 5 illustrates a graphical user interface (GUI) 500 that is generated by the conversion tool 150 in an embodiment according to the present invention. In the example of FIG. 5, the GUI includes a reference window 510, a content window 520, and a preview window 530. The windows 510, 520, and 530 can be displayed individually, or they can be displayed concurrently in any combination. A drop-down menu in each window can be used to select which window or windows are to be displayed, and so can be used to open one of the other windows.

The reference window 510 displays a page from the file to be converted. That is, the reference window 510 displays a page based on the input file 202 of FIG. 2. The content window 520 displays the text and image elements referred to above, allowing those elements to be manually edited (see FIG. 6). The preview window 530 displays a page from the resulting output file 208.

The reference window 510 displays the contents of the input file 202 on a page-by-page basis. The reference window 510 may include a toolbar that includes commands and/or drop-down menus that can be used for navigating from one page to another and that provide other useful functionalities such as a zoom feature.

The preview window 530, in essence, displays a page based on the converted data, hence allowing an editor to view that page as it would be displayed on an electronic book device. The editor is thus able to readily identify changes that need to be made to the output file 208 so that the resulting page is satisfactory in content and appearance. The editor can manually select and change an element in the content window 520, and then refresh the preview window 530 to see the effect of that change. The preview window 530 may include a toolbar and/or drop-down menus that include commands, and may also include a scroll bar to facilitate navigation within a page.

Figure 6:
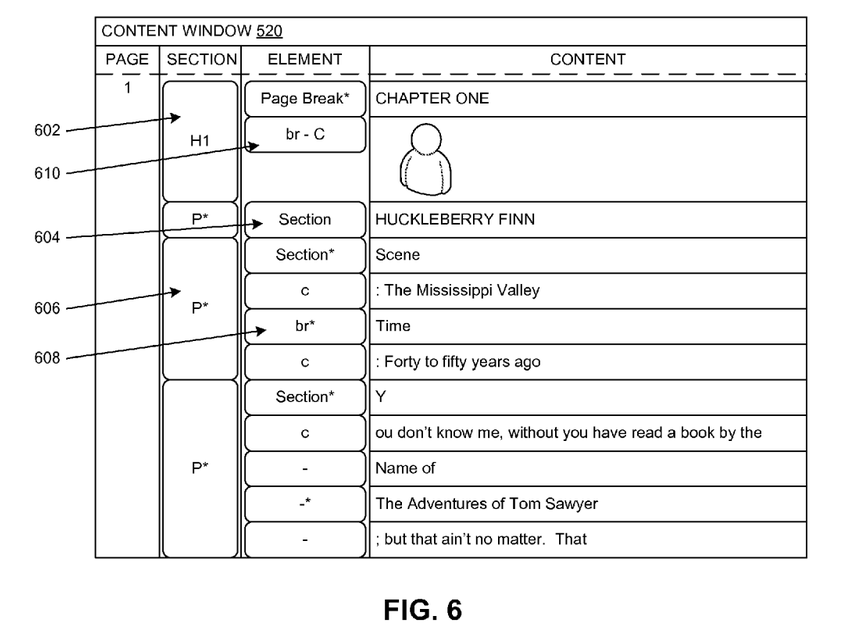
FIG. 6 illustrates a content window generated by a conversion tool according to embodiments of the present invention.

The content window 520 is described further in conjunction with FIG. 6. Using the content window, manual editing of the output file 208 (FIG. 2) is performed to achieve e-book conversion compliancy. For example, element contents can be edited, element and section statuses can be modified, elements can be manipulated (e.g., moved, deleted, inserted), and style sheets can be modified and applied across sections, to classes, or to individual elements.

In the example of FIG. 6, the content window includes four columns:

The page column identifies the page number in the PDF document in which the corresponding element is displayed.

The section column identifies the section that includes the corresponding element(s) and can be used to edit section properties.

The element column can be used to edit the status of the corresponding element.

The content column can be used to modify (edit) an element.

The content window 520 can also include commands, drop-down menus, and other types of shortcuts that allow the elements to be readily manipulated (e.g., inserted, deleted, moved) and to allow the style sheets for sections and classes to be readily edited. Elements can also be copy-and-pasted or cut-and-pasted, or selected and dragged, for example.

An element's status indicates how that element is linked to the previous element in the ordered listing. In one embodiment, six types of statuses are used:

page break: new section with a page break;
section: new section without page break;
br: line jump;
-: single space;
c: continuous (no space between the two elements); and
delete: the element is not to be displayed; this allows the element to remain in the ordered listing even though it is not displayed in the preview window 530 (FIG. 5).

Continuing with reference to FIG. 6, elements are grouped in sections according to the elements' statuses. A section begins when an element has a "new section" status (e.g., page break or section), and ends with the next new section status. In one embodiment, the conversion tool 150 uses seven types of sections, corresponding to the HTML notions of paragraph and title tags (e.g., <P>, <H1>, <H2>, <H3>, <H4>, <H5>, AND <H6>). A style sheet is defined for each section.

In the FIG. 6 embodiment, there is one "button" per section in the section column (e.g., button 602), and one button per element in the element column (e.g., button 604).

By selecting (clicking on) a section button, a pop-up window appears. The pop-up window allows the properties of the section to be edited. The pop-up window can also be used to apply a class.

More specifically, a class can be applied to any section or any text element; that is, a class can be applied to all elements in a section, or to a particular text element. Depending on to what it is applied to, a class will overwrite the style sheet parameters of a complete section, a group of elements in a section, or a single element in a section. Class style sheets can be edited. In content window 520, in one embodiment, if a class is applied to a text element or a section, then an asterisk is displayed in the section button or element button (see buttons 606 and 608, for example).

Instead of applying a class to an image element, the style properties of an image (e.g., text-wrapping, position in the page) are directly edited image-by-image. In the FIG. 6 embodiment, an image's style properties are indicated in the image element button. For example, when text wrapping is enabled, an asterisk is displayed in the element button. The position of the window is indicated by a letter ("L" for left, "R" for right, "C" for center) in the element button (see button 610, for example).

As noted above, the element column has one button per element (e.g., buttons 604, 608, and 610). By selecting an element button, a pop-up window appears. This pop-up window allows the element to be edited. This window will differ depending on the kind of element (image or text). As just described, image style properties (text-wrapping, position in the page) are directly edited. For a text element, a class can be defined and applied, or a predefined class can be selected and applied, to that text element.

To edit an element itself, that element is selected in the content column. A text element can be directly edited within the content window 520. That is, the text within a text element can be deleted, and/or new text can be inserted, much like a word processing tool is used to edit a text document. If an image element is selected, then a pop-up window is opened, displaying the path to the file that contains the selected image.

A single element can be selected, or a group of elements can be selected. An element can be moved or deleted in entirety. A drop-down menu can be used to facilitate manipulation of an element. In one embodiment, the drop-down menu is not enabled until an element is selected. The drop-down menu can be used to insert a text element or an image element at a selected location in the element column, or to delete a selected element or elements.

When an element is inserted, the current element status (the status of the preceding element) is applied to the new element. When an element is moved, its status follows it. When an element is deleted, its status is also deleted. The status of the element following the deleted element may change as a result; that is, the remaining element may assume the status of the deleted element if, in the status hierarchy, the deleted element had a higher status than the remaining element. Thus, when an element is deleted, the editor is prompted to verify that the status of the remaining element is correct.

With reference again to FIG. 5, in one embodiment, when saving an HTML export or when displaying the HTML result in the preview window 530 ("project-to-export"), the elements' content and properties in the content window 510 are interpreted by the conversion tool 150 in order to make the elements into an HTML file in XHTML format, as follows:

```
<?xml version="1.0" encoding="UTF-8"?>
<!DOCTYPE html
    PUBLIC "-//W3C//DTD XHTML 1.0 Strict//EN"
    "http://www.w3.org/TR/xhtml1/DTD/xhtml1-strict.dtd">
<html xmlns="http://www.w3.org/1999/xhtml" xml:lang="en"
lang="en">
<head>
        <!-- header content -->
</head>
<body>
        <!-- body content -->
</body>
</html>
```

The header specifies the UTF-8 character set and includes the style sheet. The style sheet specifies a style for each section and each class. Default values can be specified and used unless a different value is specified.

Following is a list of style parameters and some example values:
  font-size: xx-small, x-small, small, medium, large, x-large, xx-large;
  text-align: left, right, center, justify;
  text-indent: 0 em for no indentation or 1 em for indentation;
  vertical-alignment: subscript, superscript, baseline;
  font-weight: bold, normal;
  font-style: italic, normal;
  text-decoration: underline, none; and
  font-family: monospace, serif.

The body is made up of the succession of the elements that are to be displayed in the content window 520:
  Element and section classes are indicated with a "class" attribute in a <span> tag.
  Each section surrounds the elements included in the section.
  A section with a first element that has a "page break" status will have the "page-break-before" attribute set to "always."
  An element followed by an element that has a "br" status will have a <br I> tag at the end of the line.
  An element followed by an element that has a "-" status will be separated from the next element by a line jump in the output (e.g., HTML) file.
  Image elements that wrap text are put in a <div> tag with the "text-align" style attribute set to "left," "center," or "right."
  Image elements that do not wrap text are tagged with a "float" attribute set to "left" or "right."

When linking an export to a project, the opposite of project-to-export is performed. Elements and sections are identified in accordance with the project-to-export conversion:
  Classes associated with a given element are identified by a "class" attribute in a <span> tag.
  Each section surrounds the elements included in the section.
  Image elements are surrounded by a <div> tag with the "text-align" attribute set to "left," "center," or "right" if they do not wrap text.
  Image elements are tagged with the "float" attribute set to "left" or "right" if they wrap text.
  A text element has a "page break" status if it follows a section tag with a "page-break-before" attribute set to "always."

A text element has a "section" status if it follows a section tag without attributes.

A text element has a "br" status if there is a <br I> at the end of the previous element.

A text element has a "-" status if the previous element is in the previous line.

A text element has a "c" status if it is surrounded by a <span> tag and the previous element is in the same line.

Figure 7:
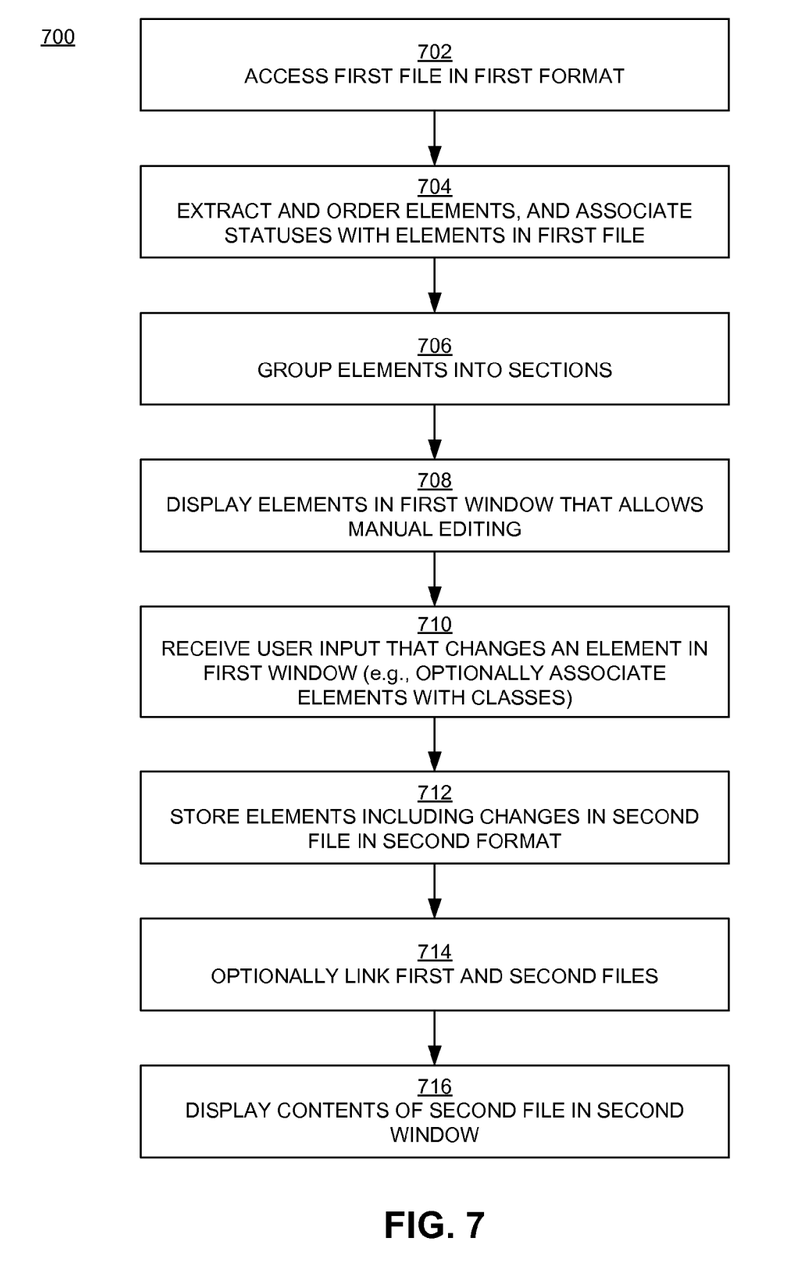
FIG. 7 is a flowchart showing operations performed by a conversion tool according to embodiments of the present invention.

FIG. 7 is a flowchart 700 summarizing operations performed by an e-book conversion tool (e.g., conversion tool 150) according to embodiments of the present invention. Although specific steps are disclosed in the flowchart 700, such steps are examples only. That is, various other steps or variations of the steps recited in the flowchart 700 can be performed. The steps in the flowchart 700 may be performed in an order different than presented. In one embodiment, the flowchart 700 is implemented as computer-readable instructions stored in a computer-usable medium.

In block 702, a first (input) file is accessed. The first file includes data in a first (fixed layout) format (e.g., PDF). The data can include text elements and image elements.

In block 704, the elements are extracted, put in order, and statuses are associated with the elements to indicate relationships between the elements.

In block 706, the elements are grouped in sections, where a style is associated with each of the sections.

In block 708, the elements are displayed in a first window (e.g., the content window 520 of FIG. 5) that allows manual editing of the text elements.

In block 710 of FIG. 7, a user input is received, causing a change to an element in the first window. For example, the element itself might be changed (e.g., one word changed to another word), or the style of an element, class, or section might be changed.

In block 712, the elements, including the change, are stored in a second (output) file that is in a second (adaptive layout) format (e.g., an XML-like format such as HTML).

In block 714, the first (input) file and the second (output) file can be linked (e.g., as a project).

In block 716, a second window (e.g., the preview window 530 of FIG. 5) is displayed along with the first window, based on contents of the second file and showing the change. A third window (e.g., the reference window 510 of FIG. 5) can also be displayed for comparison purposes, for example.

In summary, embodiments according to the present invention provide user-friendly methods and systems for converting fixed layout (e.g., PDF) files into adaptive layout (e.g., XML-like, HTML) files that are formatted for conversion into electronic documents such as e-books.

Accordingly, embodiments according to the present invention provide a semiautomatic conversion tool (e.g., for PDF-to-HTML conversion) that improves upon current e-book conversion techniques. The automatic portion of the tool initializes the conversion, doing most of the work quickly. The manual portion of the tool permits an editor, using a user-friendly interface, to make any changes that might be needed. The resulting file is fully ready for conversion to other e-book formats in a manner that is true to the original in content and appearance.

The foregoing descriptions of specific embodiments according to the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A non-transitory computer-readable medium having computer-readable program code embodied therein for causing a computer system to perform operations comprising:

accessing a first file comprising data in a first format, said data comprising elements comprising text elements and image elements;

automatically converting the first file to an intermediate form by:
extracting the text elements and the image elements;
placing the text elements and the image elements in the order that appears in an original document captured by the first file;
transforming the text elements and the image elements for further conversion; and
saving the image elements as separate image files;

converting the intermediate form to a second file that is in a second format different from said first format in order to achieve electronic book conversion compliancy by:
implementing an interactive graphical user interface displayed in a first window that allows manual editing of said elements, said graphical user interface comprising a plurality of columns including a first column that lists said elements, a second column that associates a section identifier with a subset of said elements, and a third column that associates a status identifier with each of said elements to indicate a relationship between two consecutive elements, wherein each row of the second column and each row of the third column operate as a selection button and
in the third column, upon insertion of a new element, a status of a preceding element is applied to the new element and upon deletion of an existing element, a remaining element assumes a status of the deleted element;
receiving a user input that causes a change to said elements in said first window;
upon selection of the text elements listed in the first column, prompting a text window that allows direct editing of the selected text elements in said content window;
upon selection of the image elements listed in the first column, prompting an image window that displays a path to an image file that contains the selected image elements; and
storing said elements including said change in the second file; and providing, in a second window displayed along with said first window, a display based on contents of said second file and showing said change.

2. The non-transitory computer-readable medium of claim 1 wherein said operations further comprise:
associating statuses with said elements to indicate relationships between said elements.

3. The non-transitory computer-readable medium of claim 2 wherein said operations further comprise ordering said elements in said first column according to the order in which they would be displayed on an electronic book device; and wherein a style is associated with each section comprising a subset of said elements.

4. The non-transitory computer-readable medium of claim 3 wherein said operations further comprise associating an element in a section with a class, wherein a style is associated with said class and overrides a style associated with said section.

5. The non-transitory computer-readable medium of claim 1 wherein said operations further comprise providing, in a third window, a display based on contents of said first file.

6. The non-transitory computer-readable medium of claim 1 wherein said operations further comprise automatically linking said first file and said second file.

7. The non-transitory computer-readable medium of claim 1 wherein said first format is a fixed layout format and said second format is an adaptive layout format, wherein said second format is formatted for automatic conversion to an electronic book format.

8. A computer-implemented method comprising:
   accessing data in a first format, said data comprising elements comprising text elements and image elements;
   automatically converting the first file to an intermediate form by;
      extracting the text elements and the image elements;
      placing the text elements and the image elements in the order that appears in an original document captured by the first file;
      transforming the text elements and the image elements to be compatible with further conversion; and
      saving the image elements as separate image files;
   converting the intermediate form to a second file that is in a second format different from said first format in order to achieve electronic book conversion compliancy by:
   implementing an interactive graphical user interface displayed in a content window that allows manual editing of said elements, said graphical user interface comprising a plurality of columns including a first column that lists said elements, a second column that associates a section identifier with a subset of said elements, and a third column that associates a status identifier with each of said elements to indicate a relationship between two consecutive elements,
   wherein each row of the second column and each row of the third column operate as a selection button and
   in the third column, upon insertion of a new element, a status of a preceding element is applied to the new element and upon deletion of an existing element, a remaining element assumes a status of the deleted element;
   receiving a user input comprising a selection of an element in said content window and an edit of said element;
   upon selection of the text elements, prompting a text window that allows direct editing of the selected text elements;
   upon selection of the image elements, prompting an image window that displays a path to an image file that contains the selected image elements;
   storing said elements including a result of said edit in the second format, wherein said second format is useful for automatic conversion to an electronic book format; and
   rendering, in a preview window displayed concurrently with said content window, said elements including said edit in.

9. The method of claim 8 further comprising:
   ordering said elements in said first column according to the order in which they would be displayed on an electronic book device; and
   associating statuses with said elements to indicate relationships between said elements.

10. The method of claim 9 wherein a style is associated with each section comprising a subset of said elements; and wherein said method further comprises associating an element with a class, wherein a style is associated with said class and overrides a style associated previously with said element.

11. The method of claim 9 further comprising providing, in a reference window, a display based on contents of said first file.

12. The method of claim 8 further comprising automatically linking a first file comprising said elements in said first format and a second file comprising said elements in said second format.

13. The method of claim 8 wherein said first format is a fixed layout format and said second format is an adaptive layout format, wherein said second format is formatted for automatic conversion to an electronic book format.

14. A computer system comprising:
   a processor;
   a user input device coupled to said processor;
   a display device coupled to said processor; and
   memory coupled to said processor and having stored therein instructions that, when executed by the computer system, cause said computer system to perform operations comprising:
   accessing a first file comprising data in a first format, said data comprising elements comprising text elements and image elements;
   automatically converting the first file to an intermediate form by:
      extracting the text elements and the image elements;
      placing the text elements and the image elements in the order that appears in an original document captured by the first file;
      transforming the text elements and the image elements to be compatible with further conversion; and
      saving the image elements as separate image files;
   converting the intermediate form to a second file that is in a second format different from said first format in order to achieve electronic book conversion compliancy by:
   generating and displaying a graphical user interface in a first window that allows manual editing of said elements, said graphical user interface comprising a plurality of columns including a first column that lists said elements, a second column that associates a section identifier with a subset of said elements, and a third column that associates a status identifier with each of said elements to indicate a relationship between two consecutive elements,
   wherein each row of the second column and each row of the third column operate as a selection button and
   in the third column, upon insertion of a new element, a status of a preceding element is applied to the new element and upon deletion of an existing element, a remaining element assumes a status of the deleted element;
   receiving a user input that causes a change to an element in said first window;
   upon selection of the text elements, prompting a text window that allows direct editing of the selected text elements;
   upon selection of the image elements, prompting an image window that displays a path to an image file that contains the selected image elements;
   storing said elements including said change in a second file that is in a second format different from said first format; and
   generating and displaying a second window displayed concurrently with said first window, wherein said second window is based on contents of said second file and shows said change.

15. The computer system of claim 14 wherein said operations further comprise:
- ordering said elements in said first column according to the order in which they would be displayed on an electronic book device; and
- associating statuses with said elements to indicate relationships between said elements.

16. The computer system of claim 15 wherein a style is associated with each section comprising a subset of said elements.

17. The computer system of claim 16 wherein said operations further comprise associating an element in a section with a class, wherein a style is associated with said class and overrides a style associated with said section.

18. The computer system of claim 14 wherein said operations further comprise providing, in a reference window, a display based on contents of said first file.

19. The computer system of claim 14 wherein said operations further comprise automatically linking said first file and said second file.

20. The computer system of claim 14 wherein said first format is a fixed layout format and said second format is an adaptive layout format, wherein said second format is formatted for automatic conversion to an electronic book format.

* * * * *